United States Patent [19]

Deckers et al.

[11] Patent Number: 6,060,565

[45] Date of Patent: *May 9, 2000

[54] PROCESS FOR PREPARING OXIDIZED POLYETHYLENE WAXES

[75] Inventors: Andreas Deckers, Flomborn; Hugo Brüderle, Mehlingen; Volker Sessig, Frankenthal, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/948,069

[22] Filed: Oct. 9, 1997

[30] Foreign Application Priority Data

Oct. 24, 1996 [DE] Germany ............. 196 44 270

[51] Int. Cl.$^7$ ....................................... C08F 8/06
[52] U.S. Cl. .................. 525/388; 525/333.8; 525/383; 525/386
[58] Field of Search ............... 525/388, 333.8, 525/383, 386

[56] References Cited

U.S. PATENT DOCUMENTS

| | | | |
|---|---|---|---|
| 3,692,877 | 9/1972 | Shibahara . | |
| 4,351,931 | 9/1982 | Armitage | 526/227 |
| 4,375,531 | 3/1983 | Ross | 525/93 |
| 4,417,035 | 11/1983 | Oeder | 526/208 |
| 4,459,388 | 7/1984 | Hettche | 525/376 |
| 4,632,955 | 12/1986 | Cook | 524/275 |
| 4,693,909 | 9/1987 | Ziegler | 427/156 |

FOREIGN PATENT DOCUMENTS

| | | |
|---|---|---|
| 017 229 | 10/1980 | European Pat. Off. . |
| 1237783 | 2/1962 | Germany . |
| 1299120 | 8/1962 | Germany . |
| 918 295 | 8/1959 | United Kingdom . |
| 990273 | 4/1965 | United Kingdom . |
| 997135 | 7/1965 | United Kingdom . |
| 1019847 | 2/1966 | United Kingdom . |
| 92/11331 | 7/1992 | WIPO . |

*Primary Examiner*—Fred Zitomer
*Attorney, Agent, or Firm*—Keil & Weinkauf

[57] ABSTRACT

A process is described for preparing oxidized polyethylene waxes by oxidizing such waxes with oxygen or oxygen-containing gases at from 120 to 250° C. under a pressure of from 1 to 200 bar, which involves conducting the oxidation reaction in the presence of an ethylene-(meth)acrylic acid copolymer.

8 Claims, No Drawings

PROCESS FOR PREPARING OXIDIZED POLYETHYLENE WAXES

The present invention relates to a process for preparing oxidized polyethylene waxes by oxidizing polyethylene waxes with oxygen or oxygen-containing gases at from 120 to 250° C. under a pressure of from 1 to 200 bar.

The present invention also relates to oxidized polyethylene waxes which are obtainable by this process and to the use of the oxidized polyethylene waxes in or as coating materials or in or as surface care products.

Oxidized waxes can be dispersed in water by adding appropriate auxiliaries, especially surfactants, and in this form are used widely as coating materials and care products. In addition to natural waxes, polyethylene waxes have acquired particular importance as wax base materials.

The oxidation of polyethylene waxes has been known for a long time. DE-A-1 180 131 describes a technique for oxidizing melted polyethylene waxes with oxygen or gases containing it. At the beginning of such oxidation reactions an inhibition or induction phase is observed in which there is virtually no oxidation of the wax, thereby impairing the space-time yield and impacting negatively on the economy of the technique.

Various attempts have been made to overcome these disadvantages.

Thus DE-A-12 37 783 describes the addition of ready-oxidized polyethylene wax to the oxidation mixture. Although this substantially reduces the induction time, the oxidation products exhibit considerable discolorations, which in many fields stand in the way of their use. Furthermore, aqueous dispersions prepared from this material are interspersed with numerous crosslinked gel particles.

It is an object of the present invention, therefore, to find a process for preparing oxidized polyethylene waxes which has an improved space-time yield and leads to oxidized polyethylene waxes with relatively little coloration.

We have found that this object is achieved by a process for preparing oxidized polyethylene waxes by oxidizing polyethylene waxes with oxygen or oxygen-containing gases at from 120 to 250° C. under a pressure of from 1 to 200 bar, which comprises conducting the oxidation reaction in the presence of an ethylene-(meth)acrylic acid copolymer.

We have also found oxidized polyethylene waxes obtainable by this process and the use of these oxidized polyethylene waxes in or as a coating material or surface care product.

Various polyethylene waxes can be used as the starting material, their origin not being critical. For instance, the waxes may have been prepared by high- or low-pressure polymerization and using a wide variety of catalysts, such as Ziegler, Phillips or metallocene catalysts. Preference is given to polyethylene waxes having a density of from 0.90 to 0.98 g/cm$^3$ and a molecular weight $M_w$ of from 500 to 40,000 g/mol.

Oxidizing agents which can be used are oxygen or oxygen-containing gases. Air is preferably employed for the oxidation. The oxidizing gas is either blown into the reaction mixture or injected into the mixture and introduced and distributed by, for example, stirring the mixture. For the oxidation it is preferred to establish a stream of oxygen of from 0.1 l·h$^{-1}$·kg wax$^{-1}$ to 100 l·h$^{-1}$·kg wax$^{-1}$, particularly preferably from 1 to 10 l·h$^{-1}$·kg wax$^{-1}$.

The oxidation reaction is usually conducted in a stirred autoclave.

The reaction temperature during oxidation is from 120 to 250° C., preferably from 140 to 200° C. The reaction pressure is preferably set at from 5 to 40 bar.

The oxidation time depends on the nature of the oxidizing gas and on the temperature and pressure. It is generally chosen such that the desired degree of oxidation is achieved, which may be different depending on the use of the product. A customary degree of oxidation corresponds, for example, to an acid number of 20 and is generally achieved after a reaction time of from 1 to 4 hours. The optimum reaction time can easily be determined by a few preliminary experiments.

In accordance with the invention, an ethylene-(meth)acrylic acid copolymer is added to the oxidation mixture in order to reduce the induction time. In addition to ethylene, this copolymer may include methacrylic acid units, acrylic acid units or a mixture of these. Copolymers of this kind are known and are generally prepared by high-pressure copolymerization of ethylene with the unsaturated carboxylic acids. The mode of preparation and the properties of such copolymers are described, for example, in EP-A-17 229 and U.S. Pat. No. 4,351,931.

The carboxyl-containing copolymers are generally melted together with the polyethylene waxes before the beginning of oxidation. It is therefore advantageous if the polyethylene wax and the copolymer have similar melting points and similar melt viscosities, something which can be achieved by choosing a copolymer of appropriate molecular weight and carboxyl content.

Preference is given to a process for preparing oxidized polyethylene waxes in which the oxidation reaction is conducted in the presence of from 0.1 to 20% by weight, with particular preference from 1 to 10% by weight, of an ethylene-(meth)acrylic acid copolymer, based on the overall mass of polyethylene wax and copolymer.

The ethylene-(meth)acrylic acid copolymer employed preferably comprises a proportion of acrylic acid units and/or methacrylic acid units of from 1 to 25% by weight, with particular preference from 2 to 10% by weight, based on the overall mass of the copolymer.

The oxidized polyethylene waxes obtainable by the novel process feature excellent disperseion properties. They can be dispersed in water with absolutely no gel and are virtually colorless.

On the basis of their advantageous properties, the novel oxidized polyethylene waxes can be used with advantage as or in coating materials of a wide variety of types, for example as a coating material for citrus fruits.

Furthermore, the novel oxidized polyethylene waxes are used with advantage as or in surface care products. To this end, the waxes are applied in the form of an aqueous dispersion to the surface to be cared for, such as floors, tiles or pieces of furniture, where they form a lustrous protective coating.

EXAMPLES

In a 1 l steel autoclave stirred by means of an impeller stirrer, 400 g of LDPE wax with a melt viscosity of 1200 cst (at 120° C. (mm$^2$/s), measured in accordance with DIN 51 562) and those amounts of the respective ethylene-(meth) acrylate copolymer which are indicated in the table were melted together by heating to 160° C. Then the stirrer was switched on and 30 l·h$^{-1}$·kg wax$^{-1}$ of air were passsed through the mixture. Samples were taken at 15-minute intervals and the acid number was determined by titrimetry. For comparison, oxidation was conducted in the absence of copolymer under otherwise identical conditions. The table below shows the results.

| Example | Copolymer 1* [% by wt.] | Copolymer 2* [% by wt.] | Pressure [bar] | Oxidation time to acid number of 20 [min] |
|---|---|---|---|---|
| 1 | 5 | — | 30 | 110 |
| 2 | 10 | — | 30 | 90 |
| 3 | 5 | — | 20 | 140 |
| 4 | 10 | — | 20 | 115 |
| 5 | — | 10 | 30 | 100 |
| 6 | — | 10 | 20 | 150 |
| Comp. example | — | — | 30 | 210 |

*Copolymer 1 with 5.3% by weight acrylic acid units, melt viscosity 1100 cst
**Copolymer 2 with 4.6% by weight of methacrylic acid units, melt viscosity 980 cst

We claim:

1. In a process for preparing an oxidized polyethylene wax, the improvement which comprises reducing induction time by oxidizing a polyethylene wax in the presence of oxygen or an oxygen-containing gas at a temperature of from 120 to 250° C. and at a pressure of from 1 to 200 bar, and in the presence of an ethylene-(meth)acrylic acid copolymer, and recovering the oxidized polyethylene wax.

2. The process of claim 1, wherein the ethylene-(meth) acrylic acid copolymer is present in an amount of from 0.1 to 20% by weight based on the overall mass of polyethylene wax and copolymer.

3. The process of claim 1, wherein the ethylene-(meth) acrylic acid copolymer comprises from 1 to 25% by weight of acrylic acid units and/or methacrylic acid units, based on the overall mass of the copolymer.

4. The process of claim 1, wherein air is used for the oxidation.

5. The process of claim 1, wherein the oxidation is achieved by passing a stream of oxygen at a rate of from 0.1 to 100 l/h/kg wax through the reaction mixture.

6. An oxidized polyethylene wax obtained by the process of claim 1.

7. A method of coating an article which method comprises applying an aqueous dispersion of the oxidized polyethylene wax as defined in claim 6 to a surface of the article.

8. The method of claim 7 wherein the article is a citrus fruit.

* * * * *